(12) United States Patent
Peng

(10) Patent No.: US 6,234,927 B1
(45) Date of Patent: May 22, 2001

(54) FRONT DERAILLEUR FOR A BICYCLE

(75) Inventor: Lee Cher Peng, Singapore (SG)

(73) Assignee: Shimano (Singapore) Pte., Ltd., Jurong Town (SG)

( * ) Notice: Subject to any disclaimer, the term of this patent is extended or adjusted under 35 U.S.C. 154(b) by 0 days.

(21) Appl. No.: 09/257,859

(22) Filed: Feb. 26, 1999

(51) Int. Cl.[7] .............................. F16H 7/00; F16H 9/00
(52) U.S. Cl. ............................................... 474/82; 474/80
(58) Field of Search ........................ 474/80, 82, 69–70, 474/140, 78; 74/502.4, 502.5

(56) References Cited

U.S. PATENT DOCUMENTS

| | | | |
|---|---|---|---|
| 3,730,012 | * 5/1973 | Juy ............................................ | 474/82 |
| 3,813,955 | * 6/1974 | Huret et al. ............................. | 474/82 |
| 4,226,130 | * 10/1980 | Isobe ...................................... | 474/82 |
| 4,529,395 | * 7/1985 | Coue ...................................... | 474/82 |
| 4,586,913 | * 5/1986 | Nagano .............................. | 474/82 X |
| 5,037,355 | * 8/1991 | Kobayashi ............................. | 474/82 |
| 5,104,358 | * 4/1992 | Koyabashi ............................. | 474/82 |
| 5,620,384 | 4/1997 | Kojima et al. ......................... | 474/82 |
| 5,624,336 | * 4/1997 | Kojima .................................. | 474/82 |
| 5,779,581 | * 7/1998 | Fujii ................................... | 474/80 X |
| 5,816,966 | * 10/1998 | Yang et al. ............................ | 474/82 |

FOREIGN PATENT DOCUMENTS 19703933   6/1998  (DE) .

* cited by examiner

*Primary Examiner*—David A. Bucci
*Assistant Examiner*—Marcus Charles
(74) *Attorney, Agent, or Firm*—Shinjyu Global IP Councelors, LLP

(57) ABSTRACT

A front derailleur for a bicycle is provided to move or shift a chain between two or more sprockets for changing gears. The front derailleur can be connected to the shift cable such that the shift cable is pulled upwardly or downwardly relative to the bicycle frame. The front derailleur has a fixed member adapted to be coupled to a portion of the bicycle, a chain guide for shifting the chain of the bicycle and a linkage assembly coupled between the fixed member and the chain guide. The chain guide is located above the fixed member and a coil spring is used to bias the chain guide from an extended position to a retracted position. A detachable guide member is removably coupled to the linkage assembly for guiding the shift cable downwardly relative to the bicycle frame. If the detachable guide member is removed, then the shift cable is pulled upwardly relative to the bicycle frame.

33 Claims, 10 Drawing Sheets

FRONT DERAILLEUR FOR A BICYCLE

BACKGROUND OF THE INVENTION

1. Field of the Invention

This invention generally relates to a front derailleur for a bicycle. More specifically, the present invention relates a front derailleur for a bicycle that can be used with many different shapes of bicycle frames.

2. Background Information

Generally, a front derailleur includes a fixed member nonmovably secured to a bicycle frame, and a movable section supported to be movable relative to the fixed member. The movable section supports a chain guide having a pair of vertical surfaces for contacting a chain.

The movable section is movable relative to the fixed member by pulling a shift control cable. The movable section and fixed member usually are interconnected through pivotal links. The control cable is connected to one of the pivotal links to apply a torque thereto, thereby causing the links to move the movable section. The control cable is fixed to the link in such a position that an operating force applied to the control cable. This force on the cable is converted into a link swinging torque. However, in a front derailleur having the fixed member disposed below the movable section, the above-noted position is not unnecessarily suited for an operation to attach the control cable to the pivotal link.

In view of the above, there exists a need for a front derailleur for a bicycle, which overcomes the above mentioned problems in the prior art. This invention addresses this need in the prior art as well as other needs, which will become apparent to those skilled in the art from this disclosure.

SUMMARY OF THE INVENTION

One object of the present invention is to provide a front derailleur for a bicycle that can be used with many different shapes of bicycle frames.

Another object of the present invention is to provide a front derailleur for a bicycle that has its fixed member located below the chain guide.

Still another object of the present invention is to provide a front derailleur for a bicycle that has a detachable cable guide adapter such that the front derailleur can be used with an upwardly pulled cable or a downwardly pulled cable.

The foregoing objects can basically be attained by providing a front derailleur for a bicycle comprising a fixed member, a chain guide and a linkage assembly. The fixed member is adapted to be coupled to a portion of the bicycle. The chain guide has a chain receiving slot to shift a chain of the bicycle in a transverse direction. The linkage assembly is coupled between the fixed member and the chain guide to move the chain guide between a retracted position and an extended position. The linkage assembly includes a biasing member and a first link. The biasing member urges the chain guide to one of the retracted and extended positions. The first link is pivotally coupled relative to the fixed member. The first link has a cable attachment member adapted to be coupled to a shift cable and a detachable cable guide adapter removably coupled to the cable attachment member. The detachable cable guide has a cable receiving surface that is configured to guide the shift cable downwardly therefrom.

The foregoing objects can basically be attained by providing a front derailleur for a bicycle comprising a fixed member, a chain guide and a linkage assembly. The fixed member is adapted to be coupled to a portion of the bicycle. The chain guide has a chain receiving slot to shift a chain of the bicycle in a transverse direction. The linkage assembly is coupled between the chain guide and the fixed member to move the chain guide between a retracted position and an extended position. The chain guide is supported above the fixed member by the linkage assembly. The linkage assembly includes a coil spring, a first lower link and a second upper link. The coil spring expands and contracts in an axial direction of the coil spring to urge the chain guide to one of the retracted and extended positions. The first lower link is pivotally coupled to the fixed member, while the second upper link is fixedly coupled to the chain guide and pivotally coupled to the first lower link.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
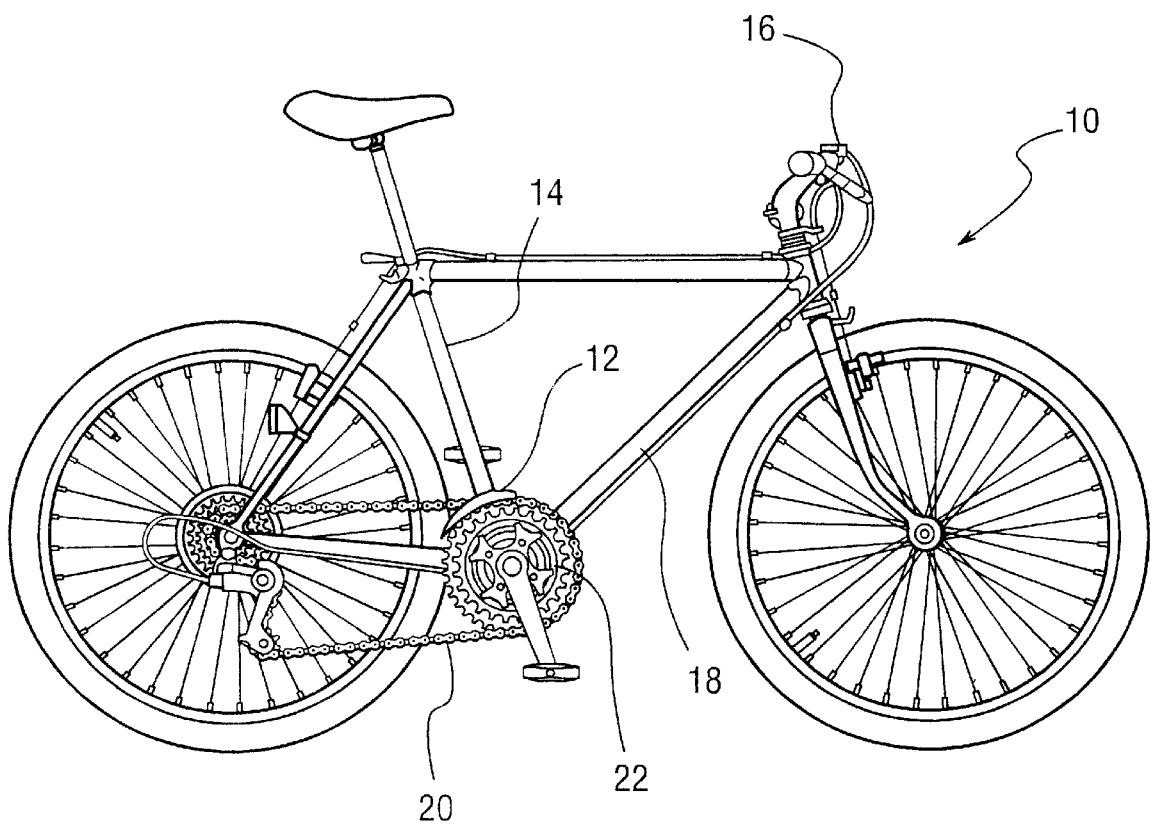
FIG. 1 is a partial side elevational view of a conventional bicycle with a front derailleur coupled thereto in accordance with one embodiment of the present invention.

Referring initially to FIG. 1, a bicycle 10 is illustrated with a front derailleur 12 fixedly coupled to its seat post portion 14 of its frame. The front derailleur 12 is operated by shifting unit 16 via a shift cable 18 to move chain 20 between sprockets 22.

Front derailleur 12 in accordance with the present invention is designed to accommodate a wide variety of bicycles. In particular, front derailleur can be used with a shift cable coming from above the front derailleur 12 or with a shift cable coming from below the front derailleur 12. In other words, the cable 18 can be coupled to front derailleur 12 such that its inner wire is either pulled upwardly or downwardly from front derailleur 12.

Bicycles and their various components are well known in the art, and thus, bicycle 10 and its various components will not be discussed or illustrated in detail herein except for the components that relate to the present invention. In other words, only front derailleur 12 and the components that relate thereto will be discussed and/or illustrated herein.

As used herein, the terms "forward, rearward, upward, above, downward, below and transverse" refer to those directions of a bicycle in its normal riding position, which front derailleur 12 is attached. Accordingly, these terms, as utilized to describe the front derailleur 12 in the claims, should be interpreted relative to bicycle 10 in its normal riding position.

While front derailleur 12 is illustrated as being fixedly coupled to seat post portion 14 of the bicycle frame, it will be apparent to those skilled in the art from this disclosure that front derailleur 12 can be coupled to other parts of the bicycle such as the bottom bracket as needed and/or desired.

Figure 2:
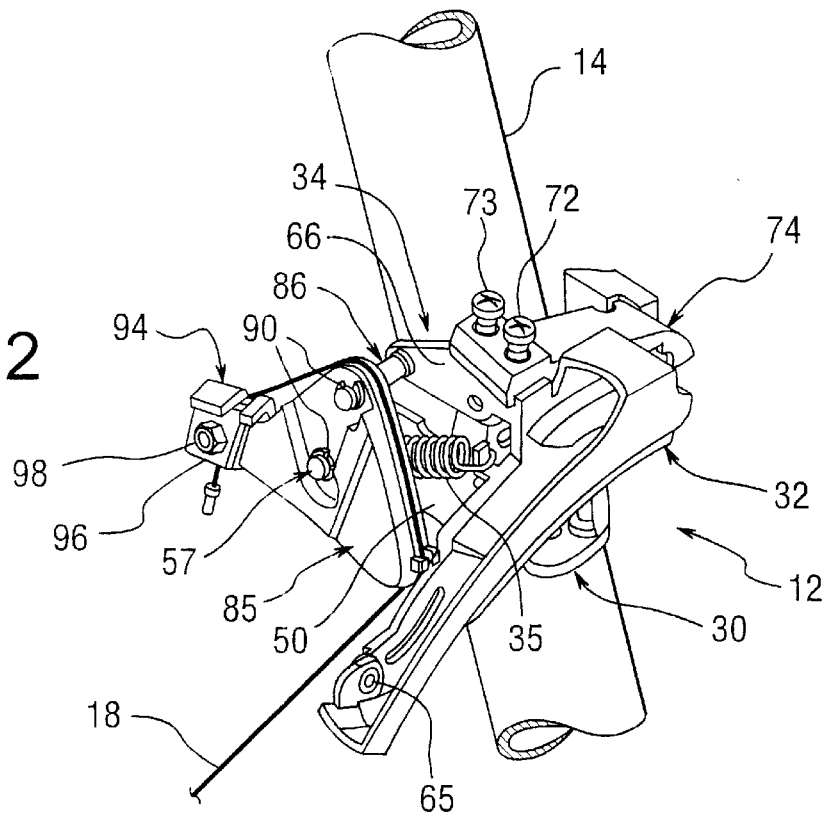
FIG. 2 is a perspective view of the front derailleur coupled to the seat post portion of the bicycle frame with a cable guide adapter attached thereto in accordance with one embodiment of the present invention.
Figure 3:
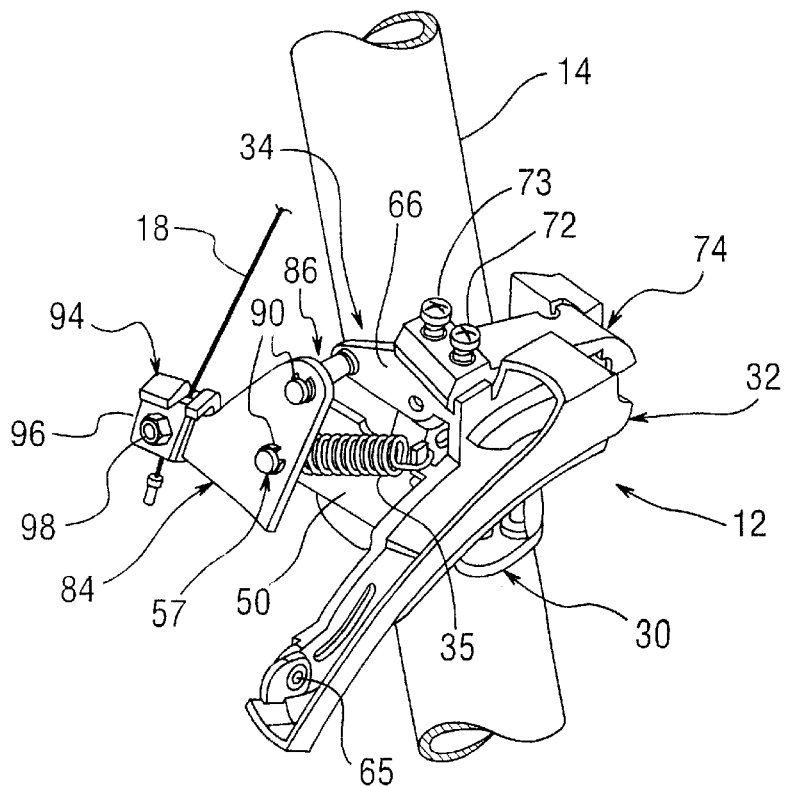
FIG. 3 is a perspective view of the front derailleur coupled to the seat post portion of the bicycle frame with the cable guide adapter removed in accordance with one embodiment of the present invention.
Figure 4:
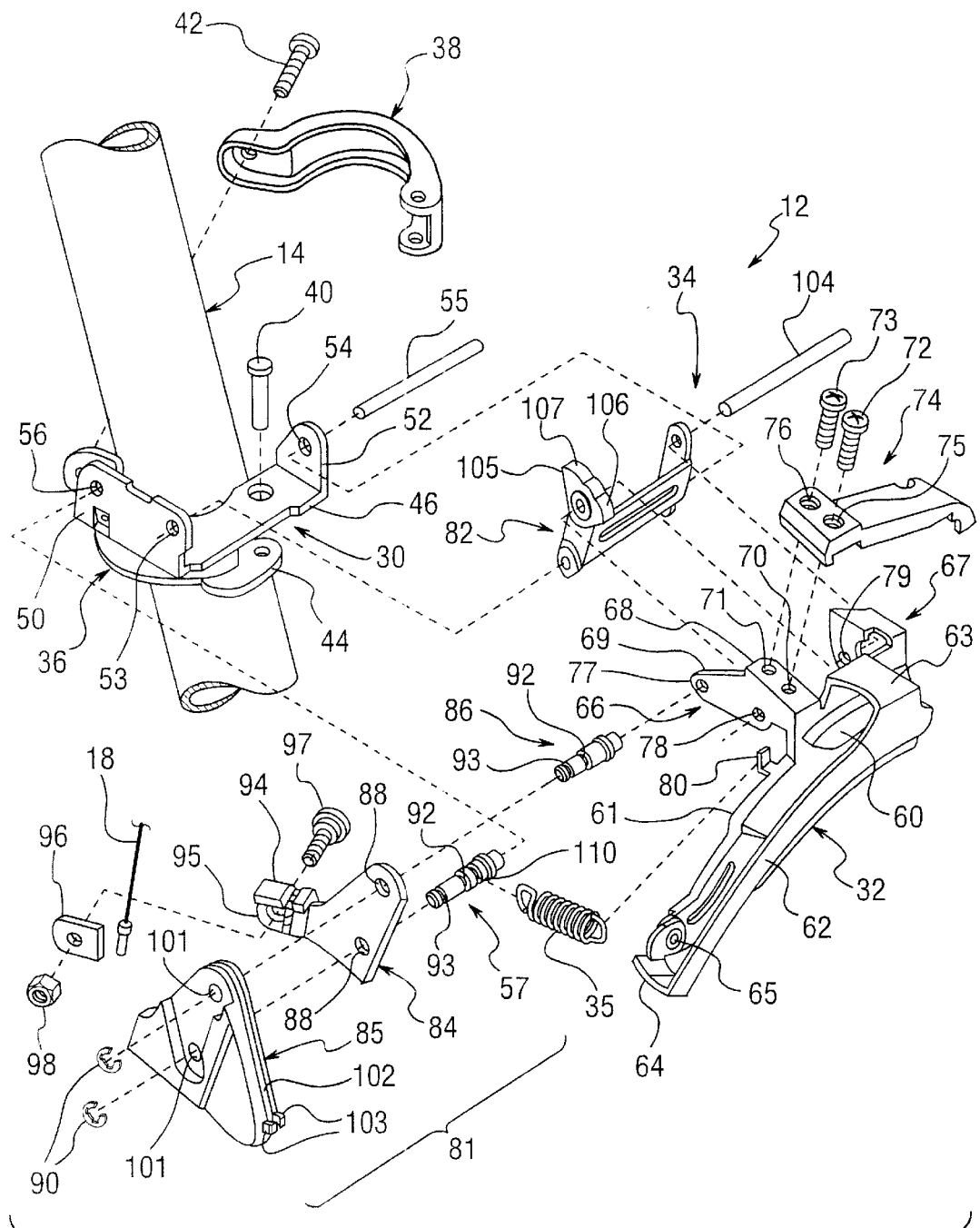
FIG. 4 is an exploded perspective view of selected parts of the front derailleur illustrated in FIG. 2 in accordance with one embodiment of the present invention.

Basically, front derailleur 12 includes a fixed member 30, a chain guide 32 and a linkage assembly 34 coupled between fixed member 30 and chain guide 32. As best seen in FIGS. 2–4, fixed member 30 is located beneath chain guide 32 and linkage assembly 34 such that chain guide 32 moves from a retracted (low gear) position to an extended (high gear) position. Linkage assembly 34 is preferably designed such that biasing member (coil spring) 35 normally biases chain guide 32 in a transverse direction towards the frame of bicycle 10. In other words, when chain guide 32 is closest to the frame of bicycle 10, chain guide 32 holds chain 20 over the sprocket 22 that is closest to seat post portion 14.

When linkage assembly 34 holds chain guide 32 in its extended position, chain guide 32 is located over the outermost sprocket 22, i.e., the furthest sprocket 22 from seat post portion 14. These movements of chain guide 32 and linkage assembly 34 are controlled by shifting unit 16. Specifically, when the rider squeezes the lever of shifting unit 16, this pulls shift cable 18 to move chain guide 32 between its extended position and its retracted position via linkage assembly 34. Shifting unit 16 can be a variety of types of shifting units. Therefore, the precise structure of shifting unit 16 will not be discussed or illustrated in detail herein.

Fixed member 30 is preferably clamped directly to the seat post portion 14. Fixed member 30 basically includes a first C-shaped clamping portion 36, a second C-shaped clamping portion 38, a pivot pin 40 and a fastener 42. First and second clamping portions 36 and 38 are constructed of a rigid material to secure front derailleur 12 to seat post portion 14 of bicycle 10. Preferably, clamping portions 36 and 38 are constructed of metal. Of course, clamping portions 36 and 38 could be constructed of other materials such as a hard rigid plastic material. In the illustrated embodiment, the clamping portions 36 and 38 are constructed of sheet metal that is bent to the desired shape. Of course, clamping portions 36 and 38 can also be constructed by utilizing other manufacturing techniques such as casting and/or machining.

First ends of clamping portions 36 and 38 are pivotally coupled together by pivot pin 40, which extends in a substantially vertical direction relative to bicycle 10. The other ends of clamping portions 36 and 38 are releasably connected together via fastener 42. Fastener 42 is preferably a screw or bolt that is threaded into a threaded hole of first clamping portion 36. Of course, fastener 42 can be utilized in conjunction with a nut, or the like.

As best seen in FIG. 4, first clamping portion 36 includes portions of linkage assembly 34. In other words, portions of linkage assembly 34 are integrally formed with first clamping portion 36, as explained below. More specifically, first clamping portion 36 has a first pair of substantially parallel mounting flanges 44 and 46 that extend in a substantially horizontal direction. These flanges 44 and 46 have vertically aligned holes for receiving pivot pin 40 therein. Pivot pin 40 is preferably a rivet that pivotally secures second clamping portion 38 between flanges 44 and 46 of first clamping portion 36.

The upper flange 46 has a pair of substantially parallel mounting flanges 50 and 52 that extend in substantially vertical directions. Mounting flanges 50 and 52 each have a pivot hole 53 and 54 that receives pivot pin 55 for mounting a portion of linkage assembly 34 thereto, as explained below. Mounting flange 50 also has a second pivot hole 56 for receiving pivot pin 57 therein to couple another portion of linkage assembly 34 thereto. As explained below in more detail, flange 50 forms one of the links of linkage assembly 34. Accordingly, flange 50 is a non-movable link.

Figure 5:
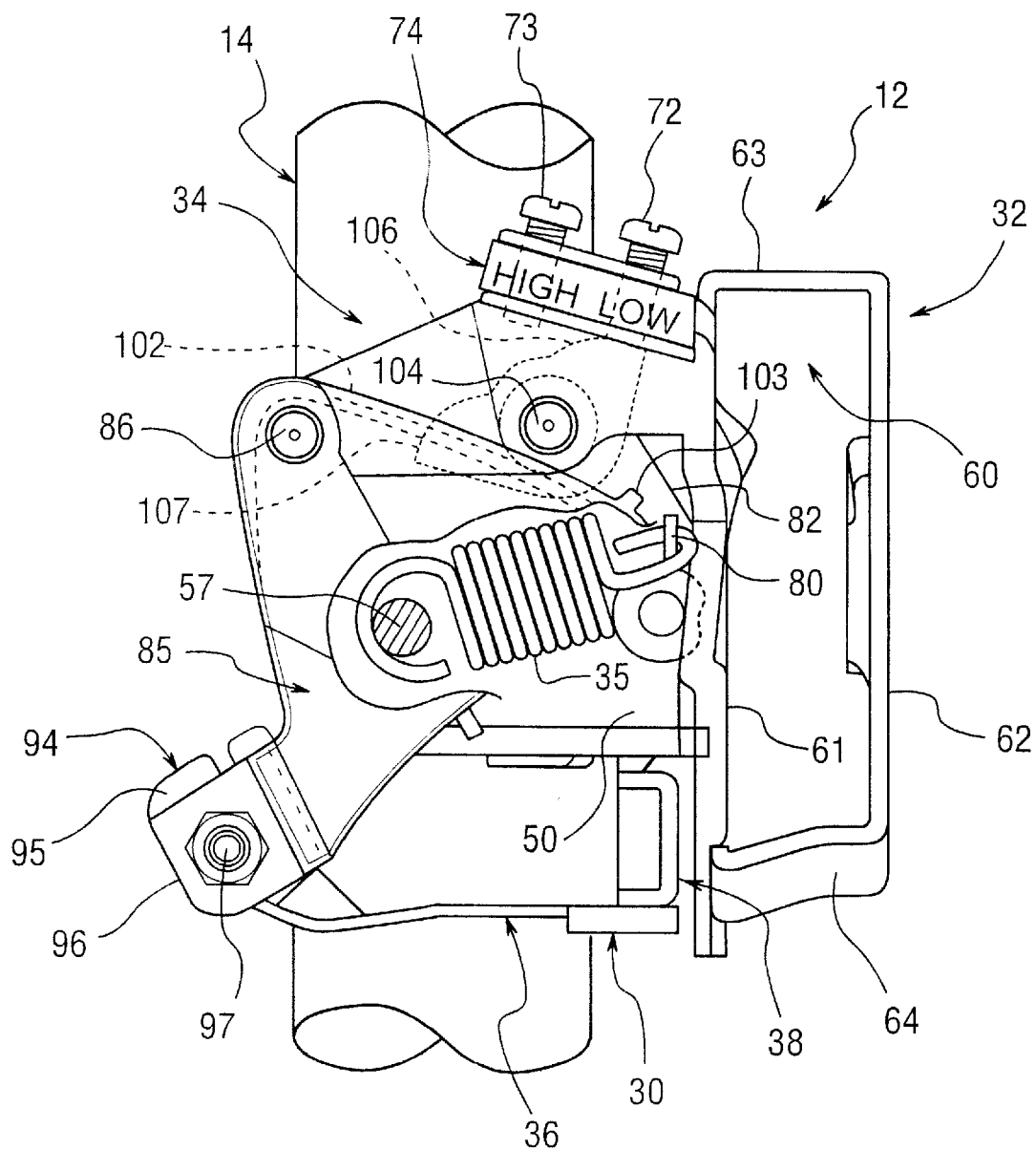
FIG. 5 is a partial rear elevational view of selected parts of the front derailleur illustrated in FIGS. 2–4, with the front derailleur in its first or low gear position.
Figure 6:
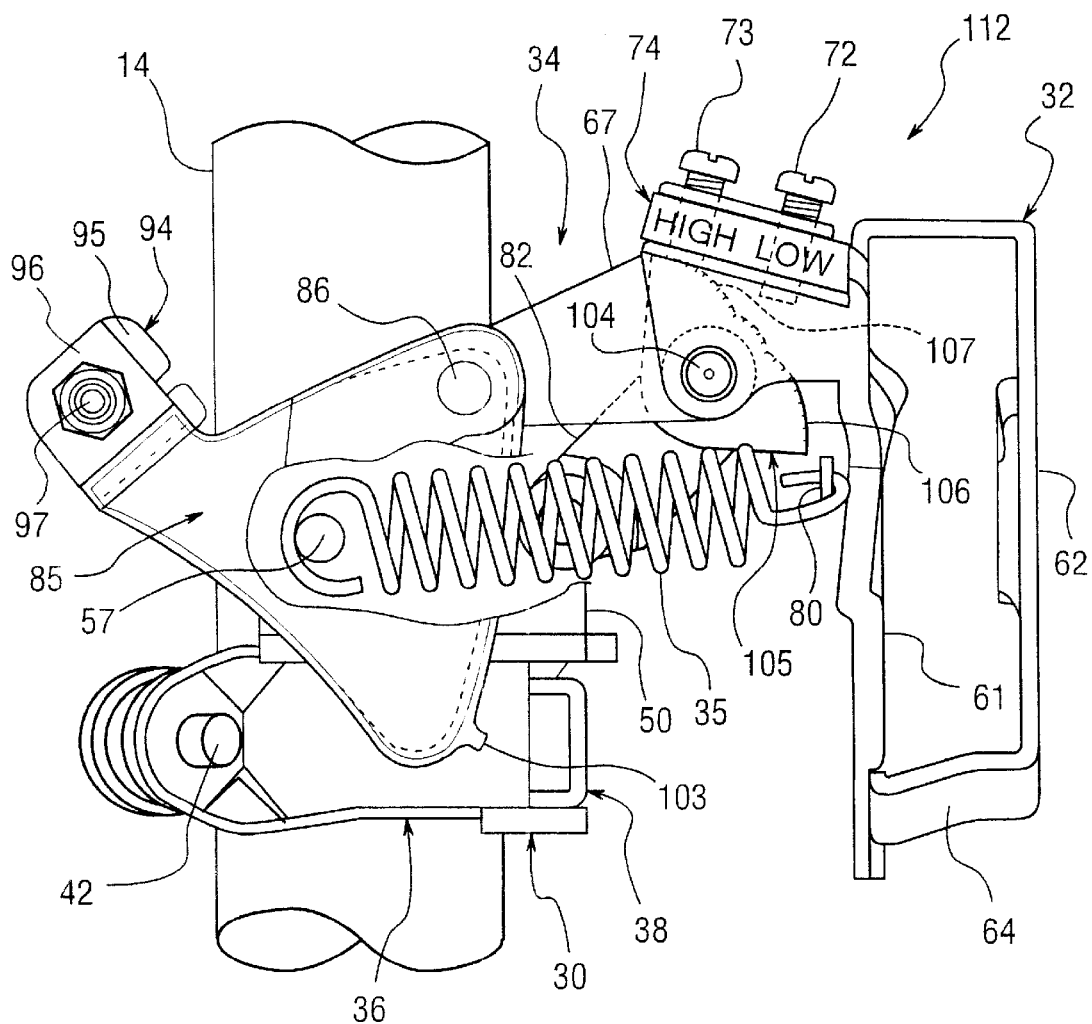
FIG. 6 is a partial side elevational view of selected parts of the front derailleur illustrated in FIGS. 2–5, with the front derailleur in its second or high gear position.

As best seen in FIGS. 4–6, chain guide 32 is preferably constructed of a hard rigid material. For example, chain guide 32 is preferably constructed of metal such as a rigid sheet metal that is bent to the desired shape. Chain guide 32 has a chain receiving slot 60 formed by a pair of vertical shift plates 61 and 62 that are adapted to engage chain 20 for moving chain 20 in a direction transverse to bicycle 10. Shift plates 61 and 62 are connected together by plates 63 and 64. Plate 63 is integrally formed between shift plates 61 and 62. Plate 64 has one end that is integrally formed with shift plate 62 and another end that is detachably coupled to shift plate 61 via screw 65.

Chain guide 32 also has a pair of mounting flanges 66 and 67 extending in a substantially horizontal direction from shift plate 61 for coupling linkage assembly 34 thereto. Mounting flange 66 forms one of the links of linkage assembly 34. More specifically, mounting flange 66 has a substantially horizontal section 68 and a substantially vertical section 69. Horizontal section 68 has a pair of threaded holes 70 and 71 for receiving adjustment screws 72 and 73 thereto. Adjustment screw 72 is a low position adjustment screw, while adjustment screw 73 is a high position adjustment screw. Adjustment screws 72 and 73 engage a portion of linkage assembly 34 as discussed below for controlling the range of movement of chain guide 32. In other words, by individually adjusting the axial extension of adjustment screws 72 and 73 relative to horizontal section 68, the retracted (low gear) position and the extended (high gear) position of chain guide 32 are adjusted independently of each other.

A top cover 74 is provided to overlie mounting flanges 66 and 67. Top cover 74 is preferably a non-metallic or plastic member that has a pair of bores 75 and 76. The bores 75 and 76 are initially formed with diameters that are slightly smaller than the thread diameters of adjustment screws 72 and 73. Accordingly, when adjustment screws 72 and 73 are threaded through bores 75 and 76, the non-metallic material is cut or tapped to form internal threads. This creates a friction fit between top cover 74 and adjustment screws 72 and 73. Accordingly, adjustment screws 72 and 73 will typically not move in an axial direction due to vibrations because of this frictional force between top cover 74 and adjustment screws 72 and 73, unless the screws 72 and 73 are manually adjusted by a person.

Vertical section 69 of mounting flange 66 forms one of the links of the linkage assembly 34. Mounting flange 66 has a pair of pivot holes 77 and 78 for pivotally mounting a pair of links of linkage assembly 34 thereto, as discussed below. Mounting flange 67 has a pivot hole 79 that is aligned with pivot hole 78 of vertical section 69 for pivotally coupling a link of linkage assembly 34 therebetween.

Shift plate 61 of chain guide 32 is also preferably provided with an L-shaped tab 80. Tab 80 is coupled to one end of biasing member 35 for normally biasing chain guide 32 from its extended position to its retracted position.

Linkage assembly 34 is preferably a four-bar linkage assembly having a first link 81, a second link (vertical section) 69, a third link (mounting flange) 50 and a fourth link 82. First link 81 has its pivot points lying on a line which is substantially parallel to a line that passes through the pivot points of fourth link 82. Similarly, second link (vertical section) 69 has its pivot points lying on a line which is substantially parallel to a line passing through the pivot points of third link (mounting flange) 50.

Figure 7:
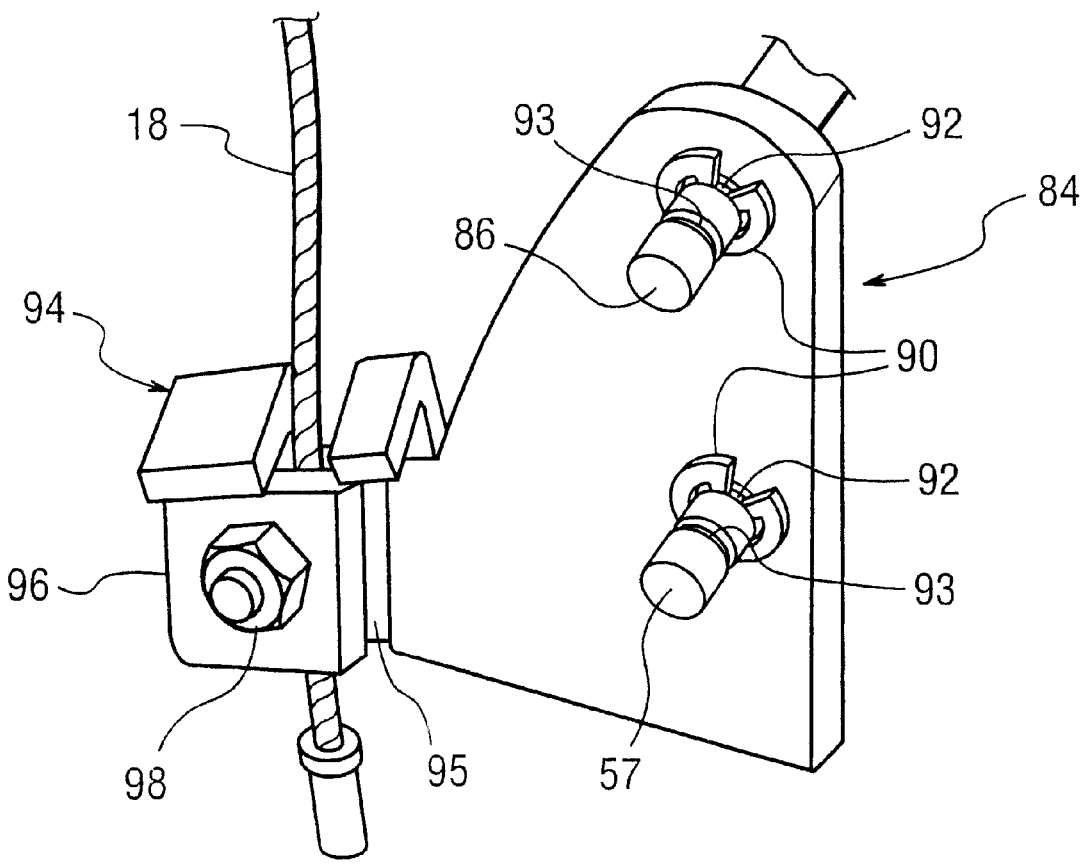
FIG. 7 is a partial rear elevational view of the cable attachment member for the a front derailleur illustrated in FIGS. 2–6.

First link 81 is preferably constructed of two main parts. Specifically, first link 81 includes a cable attachment member 84 and a cable guide adapter 85. Cable attachment member 84 is pivotally coupled at one end to second link or vertical section 69 by pivot pin 86. The other end of cable attachment member 84 is pivotally coupled to third link or flange 50 of fixed member 30 via pivot pin 57. Accordingly, cable attachment member 84 has a pair of spaced pivot holes 88 for receiving pivot pins 86 and 57 therein. Cable attachment member 84 is preferably secured on pivot pins 86 and 87 by snap-on retaining washers 90. More specifically, pivot pins 86 and 87 each have a pair of axially spaced grooves 92 and 93 for selectively receiving retaining washers 90 as seen in FIG. 7. Retaining washers 90 are received within grooves 92 when cable guide adapter 87 is not used, while retaining washers 90 are received in grooves 93 when cable guide adapter 85 is to be installed on cable attachment member 84.

Cable attachment member 84 has a wire clamp 94 for attaching the inner wire of cable 18 thereto. Preferably, wire clamp 94 includes a fixed portion 95 and a movable portion 96 coupled together via bolt 97 and nut 98.

Cable guide adapter 85 is preferably a triangular member having a pair of mounting holes 101 for receiving the ends of pivot pins 86 and 57 therein. As mentioned above, cable guide adapter 85 is retained on pivot pins 86 and 57 when retaining washers 90 are received within the grooves 93 of pivot pins 86 and 57.

Preferably, these retaining washers 90 are preferably E-shaped retaining clips that are snapped into either retaining grooves 92 or retaining grooves 93. The edge of cable guide adapter 85 is provided with a retaining groove or recess 102 that receives the inner wire of shift cable 18 therein.

Cable guide adapter 85 is utilized on front derailleur 12 when it is desirable to have the shift cable 18 located below the front derailleur 12. Accordingly, cable guide adapter 85 guides the inner wire of the shift cable 18 around the edge of cable guide adapter 85 and then downwardly to the point where cable 18 is coupled to the bicycle frame. Two retaining flanges 103 are provided adjacent to retaining recess 102 such that the inner wire of shift cable 18 does not accidentally pop out of retaining recess 102.

Fourth link 82 is pivotally mounted to second link or vertical section 69 of chain guide 32 via pivot pin 104. Specifically, pivot pin 104 is received in pivot holes 78 and 79 of flanges 66 and 67. The other end of fourth link 82 is pivotally mounted on pivot pin 55 of third link or mounting flange 50. The upper end of fourth link 82 is provided with a fan-shaped member 105 that engages adjustment screws 72 and 73 for limiting movement of chain guide 32 between its retracted position and its extended position. More specifically, fan member 105 is provided with a low stopping surface 106 and a high stopping surface 107 as best seen in FIGS. 5 and 6. Low stopping surface 106 is designed to engage the free end of low adjustment screw 72, while high stopping surface 107 is positioned to engage the high adjustment screw 73. Since this is a relatively conventional adjustment mechanism that is well known in the prior art, this adjustment mechanism will not be discussed or illustrated in detail herein.

Biasing member 35 is preferably a coil spring having a first end mounted on pivot pin 57 and a second end mounted on tab 80 of chain guide 32 for normally biasing chain guide 32 from its extended position to its retracted position. In other words, biasing member or coil spring 35 is a coil spring that expands and contracts in an axial direction, and is normally placed under tension to urge the cable guide 32 from its extended position to its retracted position. Of course, movement of chain guide 32 is controlled by shifting unit 16 moving cable 18 in a relatively conventional manner.

Preferably, pivot pin 57 is provided with a groove 110 that is located between cable attachment member 84 of first link 81 and second link or mounting flange 50. More specifically, pivot pin 57 is a stepped pin that is riveted in hole 56 of second link or flange 50, and has cable attachment member 84 and cable guide adapter 85 detachably coupled to the other end via one of the retaining washers 90.

SECOND EMBODIMENT

Figure 8:
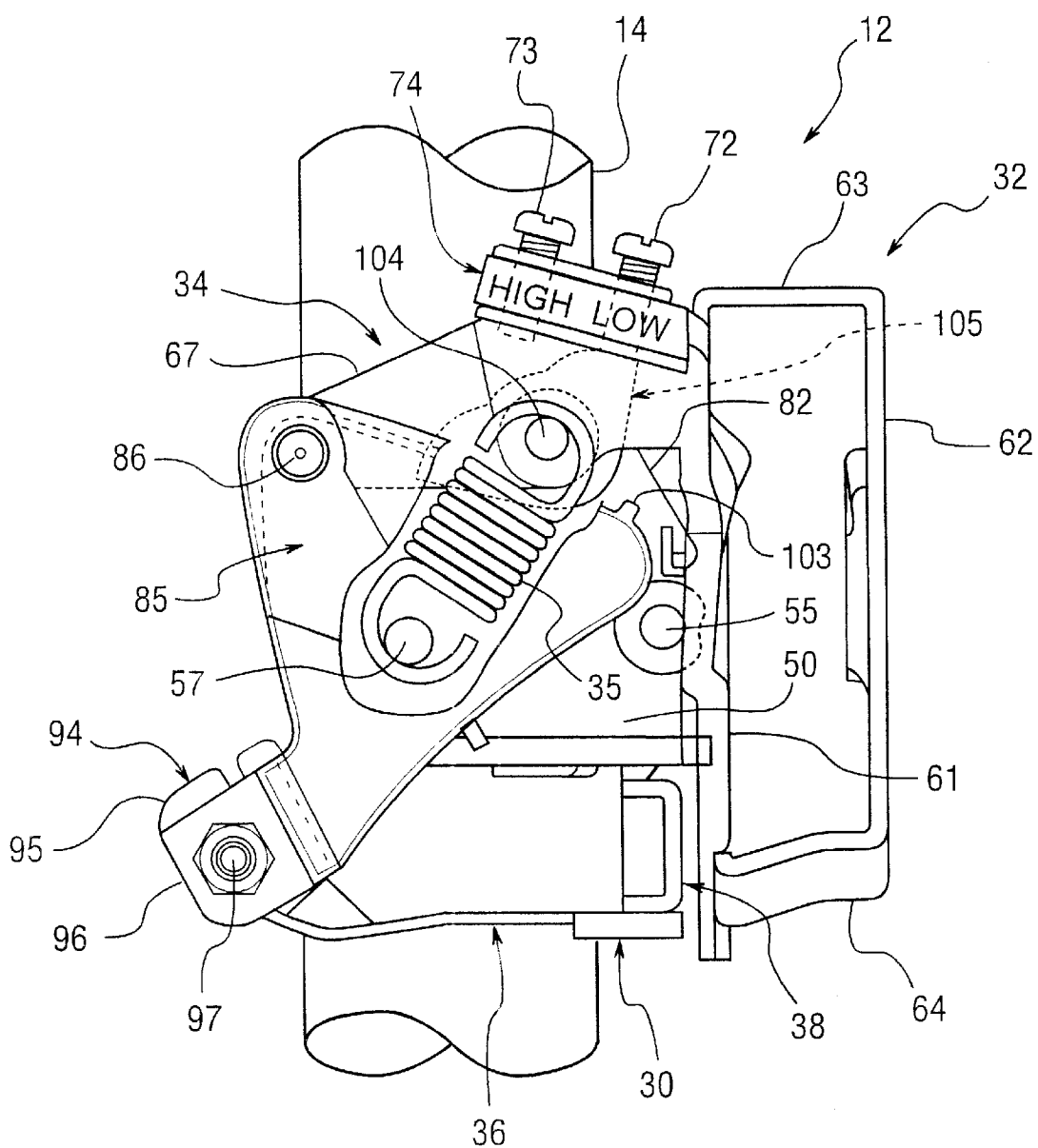
FIG. 8 is a partial rear elevational view of selected parts of an alternate embodiment of a front derailleur in its first or low gear position in accordance with another embodiment of the present invention.

Referring now to FIG. 8, a second embodiment of the present invention is illustrated. This embodiment is similar to the prior embodiment, discussed above, except that the arrangement of biasing member or coil spring 35 of this embodiment has been moved. In this second embodiment, biasing member 35 has its first end mounted on pivot pin 57, but the second end is now mounted on pivot pin 104. The purpose of the biasing member 35 is still the same, that is, for normally biasing chain guide 32 from its extended position to its retracted position.

In view of the similarities between this embodiment and the prior embodiment, identical reference numerals will be utilized to refer to the parts of this embodiment that correspond to the first embodiment. Moreover, it will be apparent to those skilled in the art from this disclosure that the various parts and descriptions of the prior embodiments apply to the similar identical parts of this embodiment. Thus, the front derailleur 12 of this embodiment will not be discussed or illustrated in as much detail. Rather, it will be apparent to those skilled in the art from this disclosure that the various parts and descriptions of the prior embodiments apply to the similar or identical parts of this embodiment.

THIRD EMBODIMENT

Figure 9:
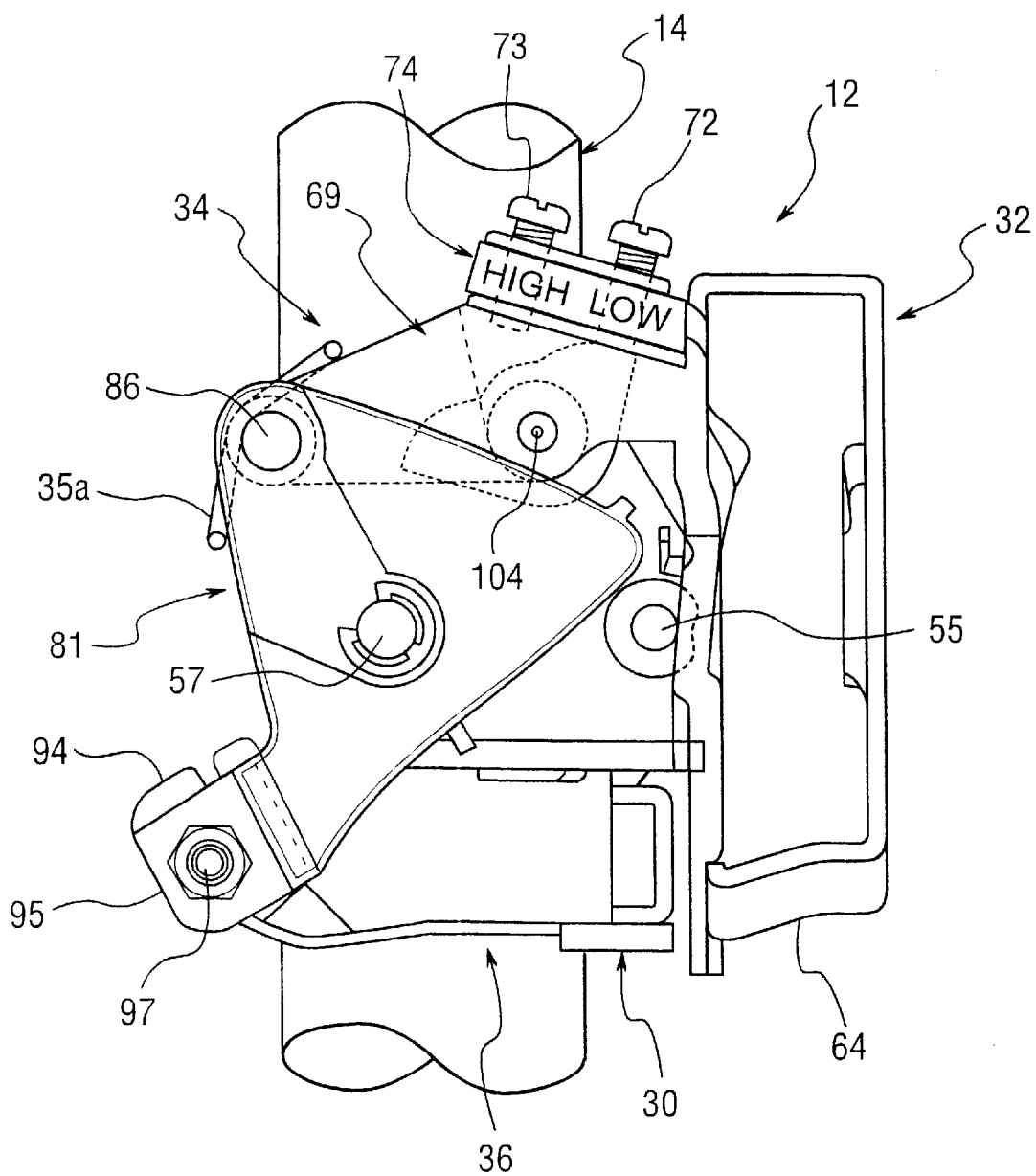
FIG. 9 is a partial rear elevational view of selected parts of an alternate embodiment of a front derailleur in its first or low gear position in accordance with another embodiment of the present invention.

Referring now to FIG. 9, a third embodiment of the present invention is illustrated. This embodiment is similar to the prior embodiment, discussed above, except that the biasing member 35a of this embodiment has been modified to use a torsion spring instead of a coil spring.

In this embodiment, biasing member 35a is a torsion spring with its coiled portion wrapped around pivot pin 86. One end of the torsion spring 35a contacts first link 81, while the other end of torsion spring 35a contacts second link or vertical section 69 of chain guide 32. The torsion spring 35a is normally placed under tension to urge the cable guide 32 from its extended position to its retracted position. Of course, movement of chain guide 32 is controlled by shifting unit 16 moving cable 18 in a relatively conventional manner.

In view of the similarities between this embodiment and the prior embodiment, identical reference numerals will be utilized to refer to the parts of this embodiment that correspond to the first embodiment. Moreover, it will be apparent to those skilled in the art from this disclosure that the various parts and descriptions of the prior embodiments apply to the similar identical parts of this embodiment. Thus, this embodiment of the front derailleur will not be discussed or illustrated in as much detail. Rather, it will be apparent to those skilled in the art from this disclosure that the various parts and descriptions of the prior embodiments apply to the similar or identical parts of this embodiment.

FOURTH EMBODIMENT

Figure 10:
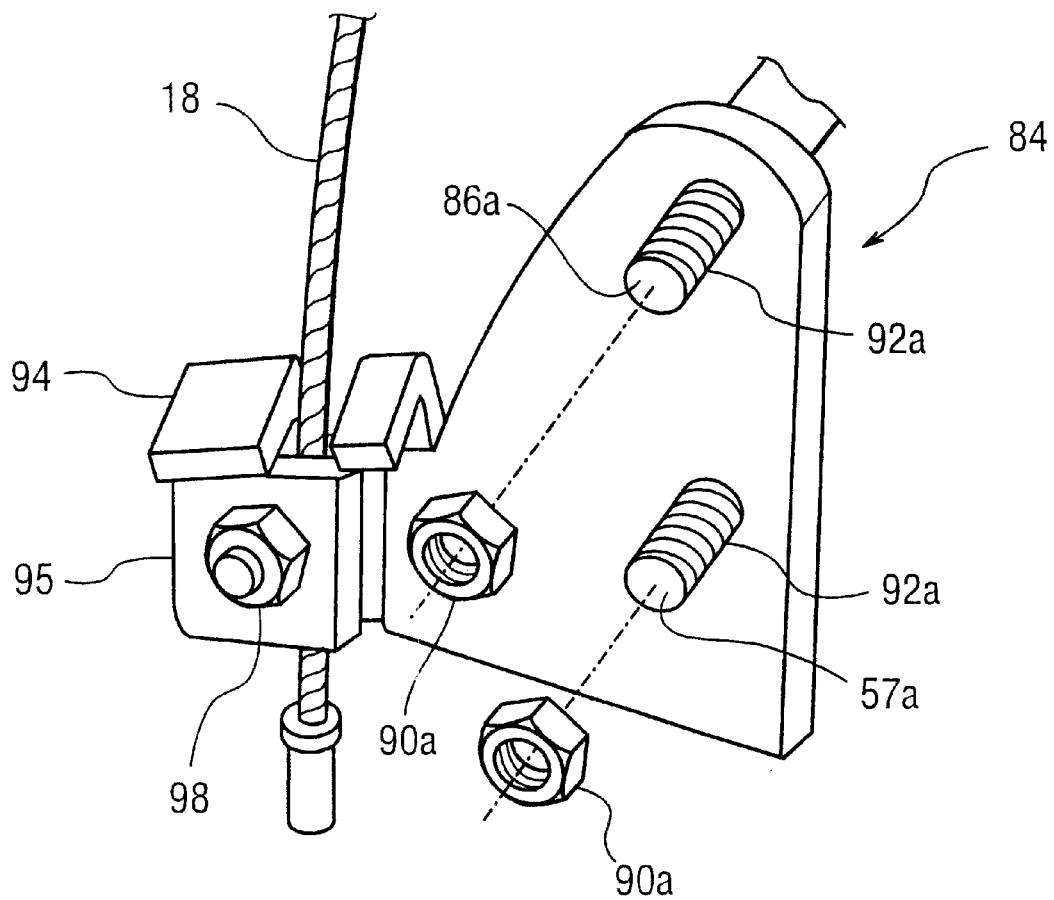
FIG. 10 is a partial exploded perspective view of selected parts of an alternate embodiment of a front derailleur in accordance with another embodiment of the present invention.

Referring now to FIG. 10, fourth embodiment of the present invention is illustrated. This embodiment is similar to prior embodiments, discussed above, except that the mounting arrangement for attaching the cable attachment member 84 and cable guide adapter 85 has been modified. Specifically, the pivot pins 86 and 57 of the first embodiment have been replaced with pivot pins 86a and 57a. Pivot pins 86a and 57a have external threads for receiving nuts 90a. Nuts 90a are preferably locking type nuts that engage the threads of pivot pins 86a and 57a such that they can be located at any point along the threads and they will not move due to vibrations or the like from bicycle 10. Pivot pins 86a and 57a are identical to pivot pins 86 and 57, discussed above, except that grooves 92 and 93 of pivot pins 86 and 57 have been replaced with external threads 92a in pivot pins 86a and 57a. Thus, pivot pins 86a and 57a will not be discussed or illustrated in further detail.

In view of the similarities between this embodiment and the prior embodiment, identical reference numerals will be utilized to refer to the parts of this embodiment that correspond to the first embodiment. Moreover, it will be apparent to those skilled in the art from this disclosure that the various parts and descriptions of the prior embodiments apply to the similar identical parts of this embodiment. Thus, this embodiment of the front derailleur will not be discussed or illustrated in as much detail. Rather, it will be apparent to those skilled in the art from this disclosure that the various parts and descriptions of the prior embodiments apply to the similar or identical parts of this embodiment.

FIFTH EMBODIMENT

Figure 11:
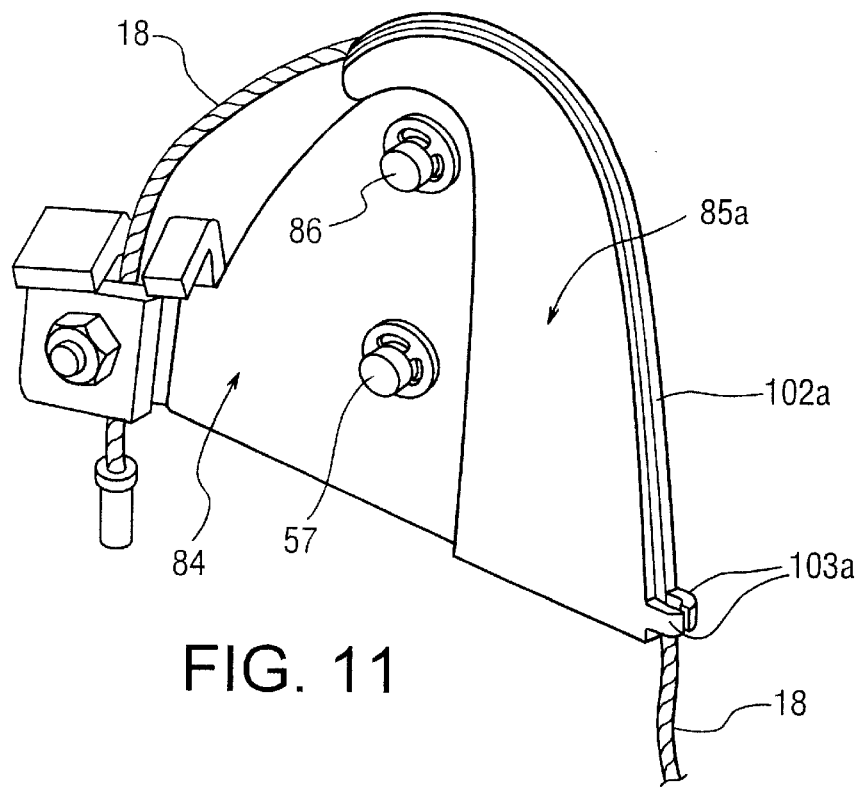
FIG. 11 is a partial perspective view of selected parts of an alternate embodiment of a front derailleur in accordance with another embodiment of the present invention.
Figure 12:
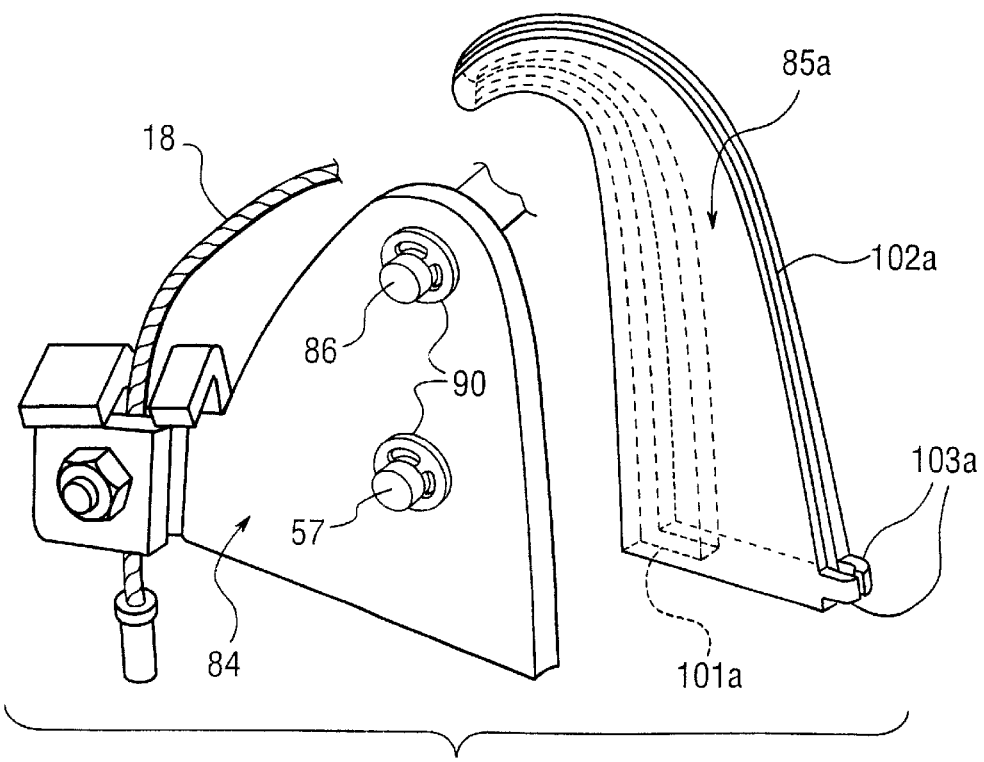
FIG. 12 is a partial exploded rear elevational view of selected parts of the alternate front derailleur illustrated in FIG. 11.

Referring now to FIGS. 11 and 12, a fifth embodiment of the present invention is illustrated. This embodiment is similar to the prior embodiments, discussed, except that cable guide adapter 85 has been modified so that it is no longer attached via pivot pins 86 and 57. More specifically, cable guide adapter 85a is designed to slip onto an edge of cable attachment member 84a. In particular, cable guide adapter 85a has a body portion with a slit or slot 101a that receives an edge of cable attachment member 84a. The tension from cable 18 will act to keep cable guide adapter 85a securely attached to cable attachment member 84a. Similar to the first embodiment, the edge of cable guide adapter 85a has a retaining recess 102a and a pair of retaining flanges 103a for holding the inner wire of cable 18 on the edge of cable guide adapter 85a.

Of course, it will be apparent to those skilled in the art from this disclosure that cable guide adapter 85a can be attached in many different ways. For example, the cable guide adapter 85a can be snap-fitted onto cable attachment member 84a utilizing various types of snap-fit connections. A friction fit can also be used to more firmly secure cable guide adapter 85a to cable attachment member 84a. Therefore, the term "means for detachably coupling" as used herein to refer to the connection between cable attachment member and the cable guide adapter includes the various attachment methods shown and disclosed herein, as well as other equivalent types of attachment mechanisms in which the cable guide adapter 85a can be detached from cable attachment member 84a without permanently destroying the front derailleur. For example, cable guide adapter 85a could be provided with deformable tabs that are plastically bent to engage the cable attachment member.

In view of the similarities between this embodiment and the prior embodiment, identical reference numerals will be utilized to refer to the parts of this embodiment that correspond to the first embodiment. Moreover, it will be apparent to those skilled in the art from this disclosure that the various parts and descriptions of the prior embodiments apply to the similar identical parts of this embodiment. Thus, this embodiment of the front derailleur will not be discussed or illustrated in as much detail. Rather, it will be apparent to those skilled in the art from this disclosure that the various parts and descriptions of the prior embodiments apply to the similar or identical parts of this embodiment.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A front derailleur for a bicycle, comprising:
   a fixed member adapted to be coupled to a portion of the bicycle;
   a chain guide having a chain receiving slot to shift a chain of the bicycle in a transverse direction; and
   a linkage assembly coupled between said fixed member and said chain guide to move said chain guide between a retracted position and an extended position, said linkage assembly including
      a biasing member urging said chain guide to one of said retracted and
      extended positions, and
   a first link pivotally coupled relative to said fixed member, said first link having a cable attachment member adapted to be coupled to a shift cable and a detachable cable guide adapter removably coupled to said cable attachment member, said detachable cable guide adapter having a cable receiving surface that is configured to guide the shift cable in an alternate direction from said cable attachment member, said detachable cable guide adapter being removably coupled to said first link so that said cable attachment member remains with said first link upon removal of said detachable cable guide adapter from said first link.

2. A front derailleur for a bicycle according to claim 1, wherein
said chain guide is located above said fixed member when mounted on the bicycle.

3. A front derailleur for a bicycle according to claim 1, wherein
said biasing member is a coil spring that expands and contracts in an axial direction of said coil spring.

4. A front derailleur for a bicycle according to claim 1, wherein
said biasing member is a torsion spring that acts on said linkage assembly to urge said chain guide to one of said retracted and extended positions.

5. A front derailleur for a bicycle according to claim 1, wherein
said linkage assembly forms a four bar linkage with a second link formed by said chain guide, a third link formed by said fixed member and a fourth link pivotally coupled between said second and third links.

6. A front derailleur for a bicycle according to claim 1, wherein
said linkage assembly further includes a second link rigidly coupled to said chain guide to move therewith.

7. A front derailleur for a bicycle according to claim 1, wherein
said cable guide adapter is detachably mounted on said cable attachment member by at least one pivot pin of said linkage assembly for said first link.

8. A front derailleur for a bicycle according to claim 1, wherein
said cable attachment member includes mounting means for detachably coupling said cable guide adapter thereto.

9. A front derailleur for a bicycle according to claim 3, wherein
said coil spring is a tension spring.

10. A front derailleur for a bicycle according to claim 6, wherein
said first link is pivotally coupled to a third link formed by said fixed member by a first pivot pin and pivotally coupled to said second link of said chain guide,
said biasing member has a first end coupled to said first pivot pin and a second end coupled to at least one of said second link and said chain guide.

11. A front derailleur for a bicycle according to claim 7, wherein
said pivot pin includes a pair of axially spaced grooves with a retaining washer selectively received and retained in one of said grooves.

12. A front derailleur for a bicycle according to claim 7, wherein
said pivot pin includes threads with a nut located thereon.

13. A front derailleur for a bicycle according to claim 8, wherein
said cable guide adapter has a slit for receiving a portion of said cable attachment member thereon.

14. A front derailleur for a bicycle according to claim 10, wherein
said linkage assembly includes a fourth link pivotally coupled to said second link at a first end and pivotally coupled to said third link of said fixed member at a second end.

15. A front derailleur for a bicycle, comprising:
a fixed member adapted to be coupled to a portion of the bicycle;
a chain guide having a chain receiving slot to shift a chain of the bicycle in a transverse direction; and
a linkage assembly coupled between said chain guide and said fixed member to move said chain guide between a retracted position and an extended position, said chain guide being supported above said fixed member by said linkage assembly,
said linkage assembly including a coil spring that expands and contracts in an axial direction of said coil spring to urge said chain guide to one of said retracted and extended positions, a first lower link pivotally coupled to said fixed member and a second upper link fixedly coupled to said chain guide and pivotally coupled to said first lower link,
said first lower link including a cable attachment member adapted to be coupled to a shift cable and a detachable cable guide adapter removably coupled to said cable attachment member, said detachable cable guide adapter having a cable receiving surface that is configured to guide the shift cable in an alternative direction.

16. A front derailleur for a bicycle according to claim 15, wherein
said first lower link is pivotally coupled to said fixed member by a first pivot pin, and
said coil spring has a first end coupled to said first pivot pin and a second end coupled to at least one of said second upper link and said chain guide.

17. A front derailleur for a bicycle according to claim 15, wherein
said cable guide adapter is detachably mounted on said cable attachment member by at least one pivot pin of said linkage assembly for said first lower link.

18. A front derailleur for a bicycle according to claim 15, wherein
said cable attachment member includes mounting means for detachably coupling said cable guide adapter thereto.

19. A front derailleur for a bicycle according to claim 16, wherein
said coil spring is a tension spring.

20. A front derailleur for a bicycle according to claim 16, wherein
said linkage assembly forms a four bar linkage with said second upper link formed integrally with said chain guide, a third link formed integrally with said fixed member and a fourth link pivotally coupled between said second and third links.

21. A front derailleur for a bicycle according to claim 16, wherein
said second end of said coil spring is coupled to a tab formed on said chain guide.

22. A front derailleur for a bicycle according to claim 17, wherein
said pivot pin includes a pair of axially spaced grooves with a retaining washer selectively received and retained in one of said grooves.

23. A front derailleur for a bicycle according to claim 17, wherein
said pivot pin includes threads with a nut located thereon.

24. A front derailleur for a bicycle according to claim 18, wherein
said cable guide adapter has a slit for receiving a portion of said cable attachment member thereon.

25. A front derailleur for a bicycle according to claim 20, wherein
said second end of said coil spring is coupled to said second upper link by a second pivot pin coupling said second upper link and said fourth link.

26. A front derailleur for a bicycle according to claim 21, wherein
said linkage assembly forms a four bar linkage with said second upper link formed integrally with said chain guide, a third link formed integrally with said fixed member and a fourth link pivotally coupled between said second and third links.

27. A front derailleur for a bicycle, comprising:
a fixed member adapted to be coupled to a portion of the bicycle;
a chain guide having a chain receiving slot to shift a chain of the bicycle in a transverse direction; and
a linkage assembly coupled between said fixed m ember and said chain guide to move said chain guide between a retracted position and an extended position, said linkage assembly including:
a biasing member urging said chain guide to one of said retracted and extended positions, and a first link pivotally coupled relative to said fixed member, said first link having a cable attachment member adapted to be coupled to a shift cable and mounting means for detachably coupling a cable guide adapter to said first link, said mounting means and said cable attachment member of said first link being configured to selectively and operatively connect the cable guide adapter thereto, said mounting means including at least one pin having a free extending from said first link and being configured to releasably mount the cable guide adapter at said free end of said pin such that the cable guide adapter moves with said first link.

28. A front derailleur for a bicycle according to claim 27, wherein
said pin of said mounting means is a pivot pin of said linkage assembly that is extended in axial length.

29. A front derailleur for a bicycle according to claim 27, wherein
said chain guide is located above said fixed member when mounted on the bicycle.

30. A front derailleur for a bicycle according to claim 27, wherein
said biasing member is a coil spring that expands and contracts in an axial direction of said coil spring.

31. A front derailleur for a bicycle according to claim 27, wherein
said linkage assembly forms a four bar linkage with a second link formed by said chain guide, a third link formed by said fixed member and a fourth link pivotally coupled between said second and third links.

32. A front derailleur for a bicycle according to claim 28, wherein
said pin includes a pair of axially spaced grooves with a retaining washer selectively received and retained in one of said grooves.

33. A front derailleur for a bicycle according to claim 28, wherein
said pin includes threads with a nut located thereon.

* * * * *